(12) United States Patent
Archer et al.

(10) Patent No.: US 6,895,176 B2
(45) Date of Patent: May 17, 2005

(54) METHOD AND APPARATUS FOR CONTROLLING ELECTRONICALLY COMMUTATED MOTOR OPERATING CHARACTERISTICS

(75) Inventors: William R. Archer, Fort Wayne, IN (US); Brian L. Beifus, Fort Wayne, IN (US); Roger C. Becerra, Fort Wayne, IN (US); Kamron M. Wright, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 10/242,537

(22) Filed: Sep. 12, 2002

(65) Prior Publication Data

US 2004/0051496 A1 Mar. 18, 2004

(51) Int. Cl.[7] ................................................. H02P 7/00
(52) U.S. Cl. ........................ 388/825; 388/800; 388/826; 388/828; 388/830; 318/138; 318/254; 318/439; 318/700; 310/220
(58) Field of Search ................................. 318/244, 246, 318/432–434, 737, 138, 254, 439, 700; 388/800, 825, 826, 830; 310/220

(56) References Cited

U.S. PATENT DOCUMENTS

| | | | |
|---|---|---|---|
| 4,309,735 A | * | 1/1982 | Morris ........................ 361/100 |
| 5,006,744 A | | 4/1991 | Archer et al. |
| 5,019,757 A | | 5/1991 | Beifus |
| 5,045,741 A | * | 9/1991 | Dvorsky ...................... 310/209 |
| 5,838,127 A | * | 11/1998 | Young et al. ................ 318/293 |
| 5,994,869 A | * | 11/1999 | Becerra ....................... 318/729 |
| 6,020,660 A | | 2/2000 | Wright |
| 6,091,170 A | * | 7/2000 | Mayes et al. ............. 310/68 B |
| 6,181,033 B1 | | 1/2001 | Wright |
| 6,215,261 B1 | | 4/2001 | Becerra |
| 6,356,044 B1 | | 3/2002 | Archer |
| 6,369,535 B1 | | 4/2002 | Wang et al. |
| 6,369,536 B2 | | 4/2002 | Beifus et al. |
| 6,388,405 B2 | | 5/2002 | Laurent |
| 6,392,372 B1 | | 5/2002 | Mays, II |
| 6,423,118 B1 | | 7/2002 | Becerra et al. |
| 6,424,114 B1 | * | 7/2002 | Komatsu ..................... 318/721 |
| 6,465,977 B1 | * | 10/2002 | Farkas et al. ................ 318/432 |

* cited by examiner

Primary Examiner—David Martin
Assistant Examiner—Tyrone Smith
(74) Attorney, Agent, or Firm—Armstrong Teasdale LLP

(57) ABSTRACT

A permanent magnet DC brushless motor control assembly permits a user to select the permanent magnet DC brushless motor operating characteristics by selecting appropriate control circuits to interface with the motor. The assembly includes a permanent magnet DC brushless motor, a commutator electrically coupled to the motor, and at least one control module electrically coupled to the commutator, to control operating characteristics of the permanent magnet DC brushless motor.

23 Claims, 4 Drawing Sheets

METHOD AND APPARATUS FOR CONTROLLING ELECTRONICALLY COMMUTATED MOTOR OPERATING CHARACTERISTICS

BACKGROUND OF THE INVENTION

This invention relates to electrically commutated motors, and more particularly, to methods and approaches used to control the operating characteristics of an electrically commutated motor.

Electrically commutated motors (ECMs) are used in a wide variety of systems operating in a wide variety of industries. As such, the ECMs are subject to many operating conditions and often, the operating conditions necessitate that the operating characteristics of the ECM be changed to match the requirements of the associated application (i.e. different speeds or airflow requirements for heating, cooling, and constant fan for residential HVAC applications). Because of the complexity of the many possible desired operating characteristics, it may be difficult to remove an ECM from one system for installation in another system. More specifically, the ECM control circuits and interfaces must typically be changed to enable the ECM to be used with different operating characteristics in different applications.

The ECM configuration problem may be further complicated when motor manufacturers produce a base motor and then develop a product line of motors with different operating characteristics based upon the base motor. Changing motor characteristics, such as, variable speed, for example, may require time-consuming changes of the control circuit or motor internals. Accordingly, many different components must be designed, manufactured, and stocked to manufacture motors with different operating characteristics based on the base motor product line. Designing, manufacturing, and stocking different parts is more expensive than designing, manufacturing, and stocking one standardized part which can be programmed for many different applications or coupled with different modules to satisfy the needs of different applications.

BRIEF DESCRIPTION OF THE INVENTION

In one aspect, a method is provided for selecting operating characteristics of a permanent magnet DC brushless motor using a control module. The method includes coupling an electronic commutator to the permanent magnet DC brushless motor, electrically coupling at least one control module to the commutator and selecting operating characteristics for the motor through the control module, the control modules are configured for controlling operating characteristics of the electronically commutated permanent magnet DC brushless motor.

In another aspect, a control assembly for an electronically commutated motor is provided that includes a permanent magnet DC brushless motor, an electronic commutator comprising an H-bridge inverter circuit, rotor position sensing circuit, low voltage power supply and gate-drive circuit, the electronic commutator coupled to the motor and electrically coupled to the motor and a control module configured to control operating characteristics of the permanent magnet DC brushless motor.

In yet another aspect, a control module for an electronically commutated motor is provided. The control module comprising at least one of: a power supply regulating circuit, an electromagnetic interference filter, an electronically commutated motor speed modulator, an electronically commutated motor torque modulator, a transient suppression circuit, an active power factor correction circuit, and a passive power factor correction circuit and a process parameter control circuit.

In still another aspect, an electronically commutated motor assembly is provided. The motor includes a permanent magnet DC brushless motor, the motor includes a plurality of external winding connections coupled to an external surface of the electronically commutated motor, at least one stator winding electrically coupled to the plurality of external winding connections, an electronic commutator circuit electrically coupled to the at least one stator winding, a position sensing electronic circuit electrically connected to the commutation electronic circuit, and an electronic commutator, the electronic commutator coupled to the motor end shield and electrically coupled to the motor.

DETAILED DESCRIPTION OF THE INVENTION

Figure 1:
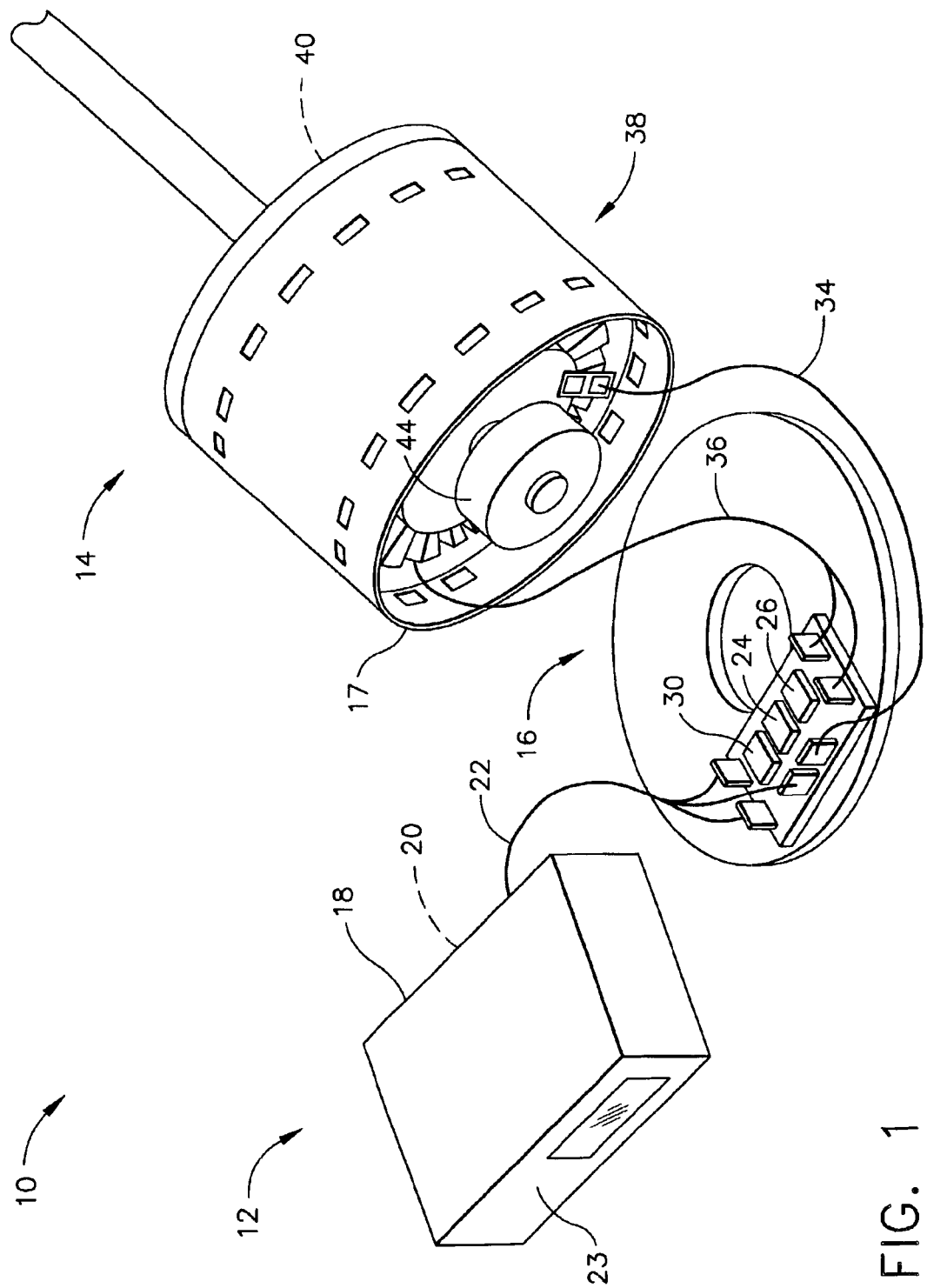
FIG. 1 is a block diagram of an electrically commutated motor (ECM) and control assembly.

FIG. 1 is a block diagram of an electrically commutated motor (ECM) control assembly 10 including a control module 12, a permanent magnet DC brush-less motor 14 and a commutator 16. When fully assembled, commutator 16 is mechanically coupled to a motor end shield 17 to form an electronically commutated motor. Control module 12 includes an enclosure 18 and a printed circuit board 20 (not shown). In one embodiment, printed circuit board 20 includes a microprocessor configured to control the output of the printed circuit board to control the operating characteristics of motor 14. In another embodiment, printed circuit board 20 is populated with a plurality of electronic components (not shown) coupled to printed circuit board 20 and each other to control the output of the printed circuit board 20 to control the operating characteristics of motor 14. In an exemplary embodiment, printed circuit board 20 is potted in enclosure 18. In one embodiment, the potting compound is UR-330, parts A and B, commercially available from Thermoset, Lord Chemical, Indianapolis, Ind. The configuration of the microprocessor and the electronic components is variable based on at least one requirement of a user. In an exemplary embodiment, control module 12 is mounted remotely from permanent magnet DC brush-less motor 14 and commutator 16. In another embodiment, control module 12 is mounted to an external surface of permanent magnet DC brush-less motor 14. In still another embodiment, a plurality of control modules are electrically coupled serially, each control module configured to control a motor operating characteristic.

Control module 12 is electrically coupled to commutator 16 by a cable 22. Control module 12 is also electrically coupled to a user's power supply and interface circuitry (not shown) by cable 23. Commutator 16 includes an H-bridge inverter 24 electrically coupled to a gate-drive circuit 26. H-bridge inverter 24 and gate-drive circuit 26 are electrically coupled to a low voltage power supply 30. The gate drive circuit is electrically coupled to a motor rotor position sensing circuit by a cable 34. The gate-drive circuit is also electrically coupled to permanent magnet DC brush-less motor 14 by a cable 36.

Motor 14 is a basic permanent magnet DC brush-less motor. In the exemplary embodiment, motor 14 is includes a single phase salient pole stator assembly, indicated generally at 38, including a stator core 40 formed from a stack of laminations made of a highly magnetically permeable material, and windings (not shown) of magnet wire wound on stator core 40 in a way known to those of ordinary skill in the art. A rotor 44 includes a rotor core (not shown) formed from a stack of laminations made of a magnetically permeable material substantially received in a central bore of stator core 40. Rotor 44 and stator 38 are illustrated as being solid in FIG. 1 for simplicity, their construction being well known to those of ordinary skill in the art.

In operation, the control module circuitry is configured according to the user's requirements. The circuitry may be configured as any of the following non-exclusive circuits alone or in combination: a power supply regulating circuit, an electromagnetic interference filter, an electronically commutated motor speed modulator, an electronically commutated motor torque modulator, a transient suppression circuit, an active power factor correction circuit, a passive power factor correction circuit and a process parameter control circuit.

Figure 2:
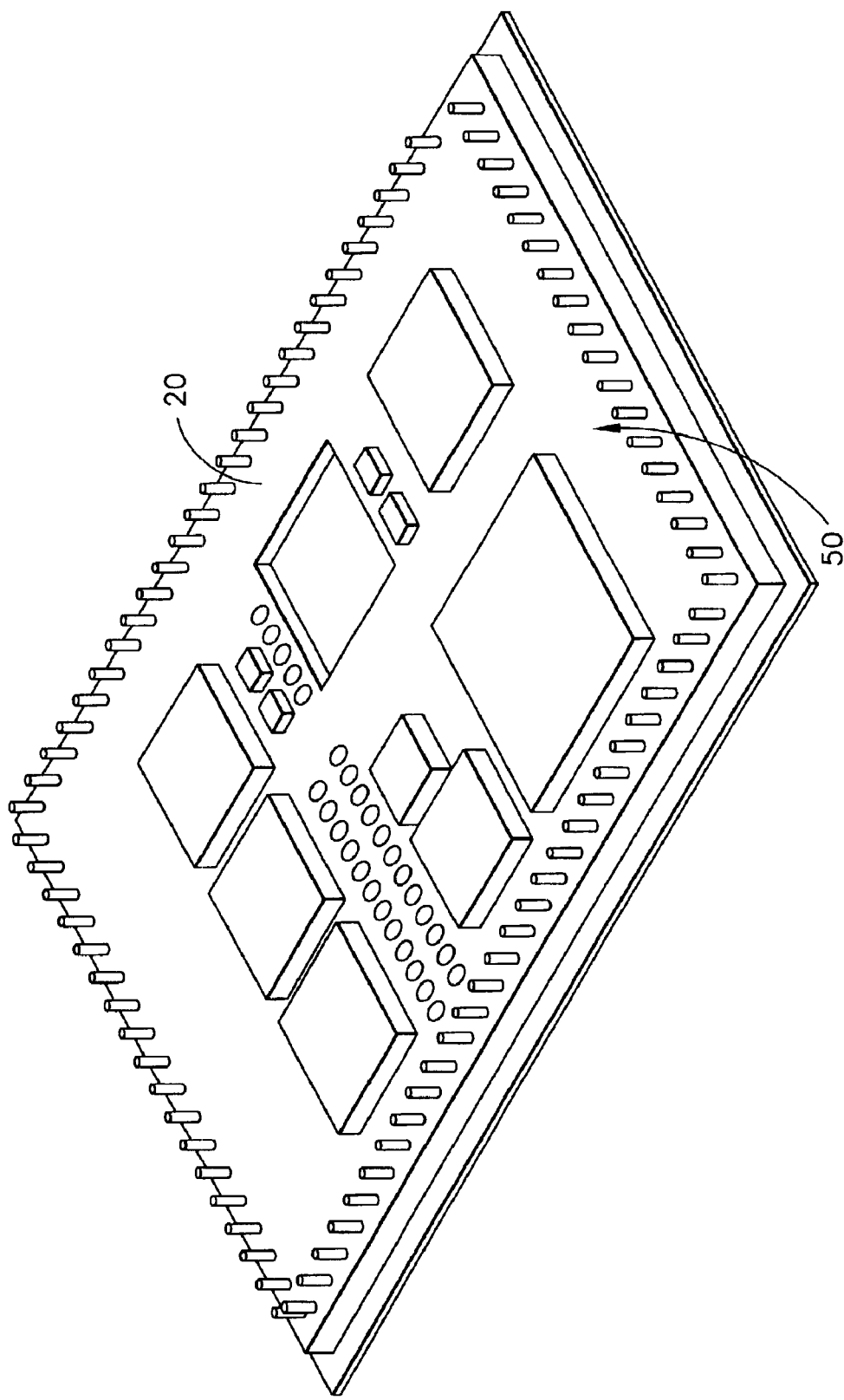
FIG. 2 is a general layout diagram of an exemplary control module.

FIG. 2 is a general layout diagram of an exemplary printed circuit board. In the exemplary embodiment, control module 12 (shown in FIG. 1) includes printed circuit board 20 potted in enclosure 18 (shown in FIG. 1). Printed circuit board 20 has printed wiring, described below, on a first side of circuit board 20. A plurality of electronic components, shown generally at 50 are mounted on a second side of circuit board 20 and are electrically connected to the printed wiring on the first side of circuit board 20. Electronic components 50 are variably selected for controlling operation of permanent magnet DC brushless motor 14 (shown in FIG. 1) in accordance with a user's specification.

Figure 3:
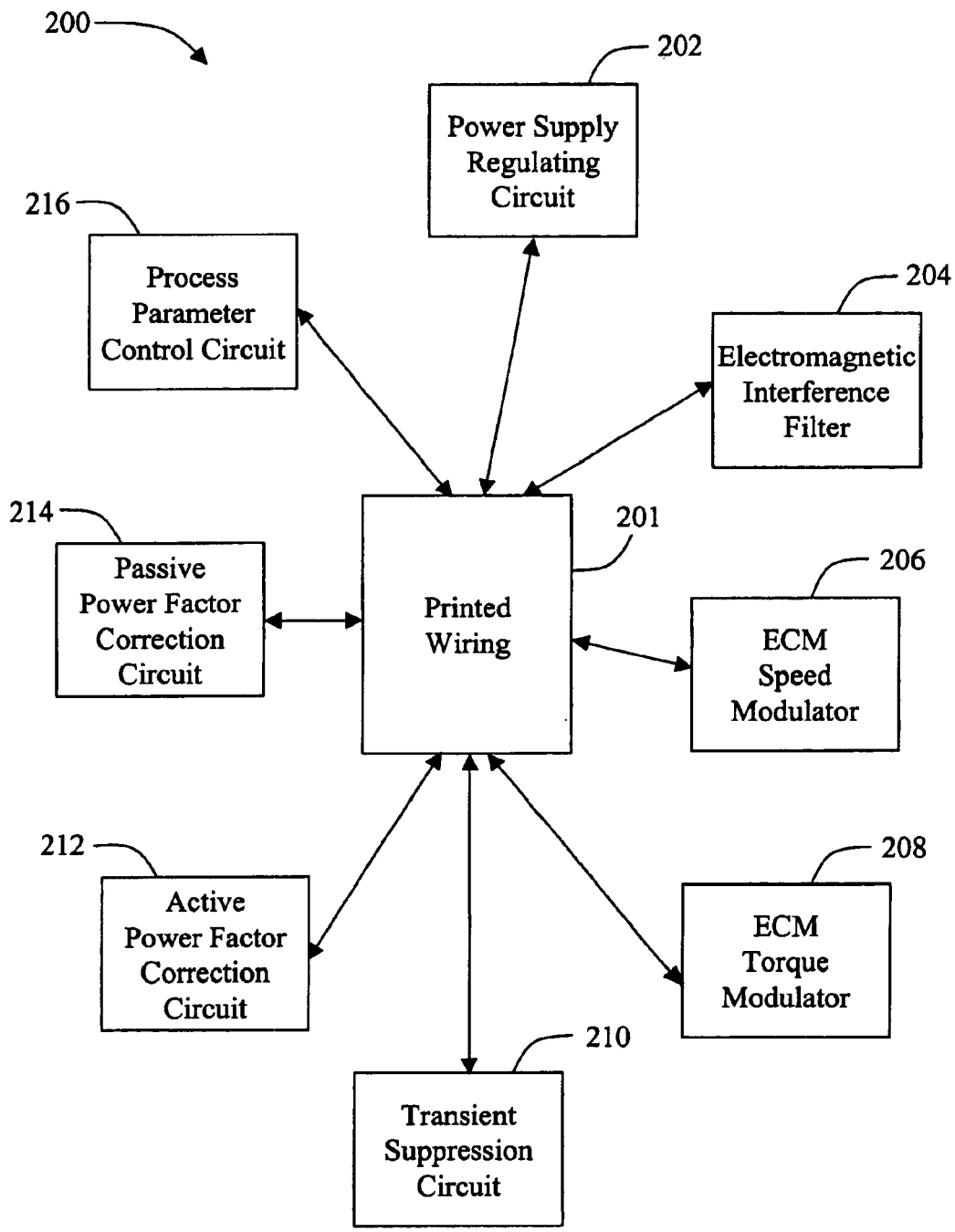
FIG. 3 shows an embodiment of a control module used to control the ECM.

FIG. 3 shows an embodiment of a control module 200 used to control motor 14. Control module 200 includes components 50 electrically connected to a printed wiring 201 on the first side of circuit board 20. Components 50 include at least one of a power supply regulating circuit 202, an electromagnetic interference filter 204, an electronically commutated motor speed modulator 206, an electronically commutated motor or torque modulator 208, a transient suppression circuit 210, an active power factor correction circuit 212, a passive power factor correction circuit 214 and a process parameter control circuit 216.

Figure 4:
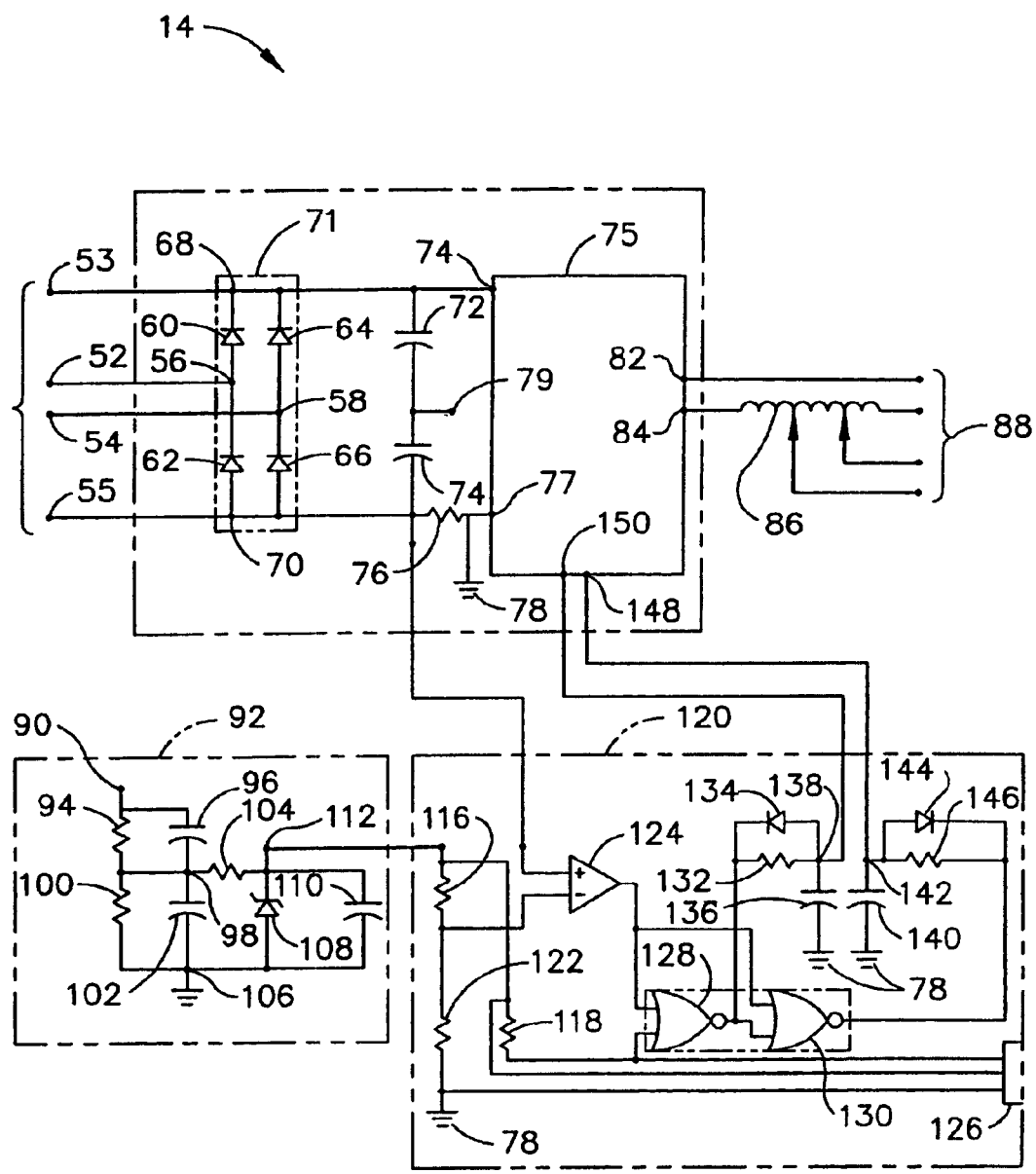
FIG. 4 is a schematic diagram of an exemplary permanent magnet DC brush-less motor and control.

FIG. 4 is a schematic diagram of an exemplary permanent magnet DC brush-less motor and control. In an exemplary embodiment, single phase alternating current (AC) power is coupled to a connection 52 and a connection 54. In another embodiment, direct current (DC) power is coupled to a connection 53 and a connection 55. Connection 52 electrically couples to a node 56. Connection 54 electrically couples to a node 58. Node 56 also electrically couples to an anode of a diode 60 and a cathode of a diode 62. Node 58 electrically couples to an anode of a diode 64 and a cathode of a diode 66. A cathode of diode 60 and a cathode of diode 64 are electrically coupled to a node 68. An anode of diode 62 and an anode of diode 66 are electrically coupled to a node 70. Diodes 60, 62, 64 and 66 are electrically coupled as a bridge rectifier 71. Node 68 is electrically coupled to connection 53, a first lead of a capacitor 72 and a node 74 on an H-bridge commutation circuit 75. Node 70 is electrically coupled to connection 55, a first lead of a capacitor 74 and a first lead of a resistor 76. A second lead of resistor 76 is electrically coupled to a node 77 on H-bridge commutation circuit 75 and a ground 78. A second lead on capacitors 72 and a second lead on capacitor 74 are connected to a node 79. A node 82 and a node 84 on H-bridge commutation circuit 75 are electrically coupled to a plurality of ECM windings 86. The ECM windings 86 are further connected to a plurality of winding tap connections 88. In one embodiment, the winding tap connections 88 couple to an external switching device, for example, a relay or contactor (not shown).

Node 79 is further electrically coupled to a node 90 in a low voltage power supply circuit 92. Node 90 electrically connects to a first lead on a resistor 94 and a first lead on a capacitor 96. A second lead on resistor 94 and a second lead on capacitor 96 further electrically couple to a node 98. Node 98 electrically couples to a first lead on a resistor 100, a first lead on a capacitor 102 and a first lead on a resistor 104. A second lead on resistor 100 and a second lead on capacitor 102 further electrically connect to a node 106. Node 106 is further electrically coupled to a anode on a zener diode 108 and a first lead on a capacitor 110. A second lead on resistor 104, a cathode on zener diode 108 and a second lead on capacitor 110 are electrically coupled to a node 112.

Node 112 is electrically coupled to a first lead on resistor 116 and to a first lead on a resistor 118 in a position sensing/gate drive circuit 120. Comment: This is also one of many possible embodiments. A second lead on resistor 116 is electrically coupled to a first lead on a resistor 122 and an inverting input on a operational amplifier (op-amp) 124. A non-inverting input of op-amp 124 is electrically coupled to node 70. A second lead on resistor 122 is electrically connected to ground 78 and to a first lead on connector 126 (Hall effect device common). The first lead of resistor 118 is electrically coupled to a second lead of connector 126 (Hall effect device V+). The second lead of resistor 118 is electrically coupled to a first input to a NOR gate 128 and to a third lead on connector 126 (Hall effect device output). An output lead of op-amp 124 is electrically coupled to a second input to NOR gate 128 and to a first input to a NOR gate 130. The output of NOR gate 128 is electrically coupled to a second input to NOR gate 130, a first lead on a resistor 132 and a cathode on a diode 134. An anode on diode 134, a second lead on resistor 132 and a first lead on capacitor 136 are electrically coupled to a node 138. A second lead on capacitor 136 is electrically coupled to ground 78. Ground 78 is electrically coupled to a first lead on a capacitor 140. A second lead on capacitor 140 is electrically coupled to a node 142. Node 142 is further electrically coupled to an anode lead on a diode 144, to a first lead on a resistor 146 and to a node 148 on H-bridge commutation circuit 75. A node 150 on H-bridge commutation circuit 75 is electrically coupled to node 138. An output lead of NOR gate 130 is electrically coupled to a second lead on resistor 146 and to a cathode lead on diode 144

In operation, in an exemplary embodiment, control module 12 is supplied with single phase alternating current (AC) power from a user's power supply. The AC input power is rectified to full-wave direct current (DC) power by bridge rectifier 71. The DC power is supplied to the H-bridge commutation circuit 75 (which then supplies the AC to the motor as described above) and the low voltage power supply 92. The low voltage power supply provides power to the position sensing circuit 120. In one embodiment, the position sensing circuit uses a Hall effect sensor (not shown) to determine the position of rotor 44. The position sensing circuit provides a position signal to properly drive the H-bridge commutation circuit 75. The H-bridge commutation circuit 75 supplies power to the ECM stator windings 86 to drive the rotor of permanent magnet DC brushless motor 14. In this embodiment further conditioning of the power to the windings is provided by the winding tap connections 88, providing a simple means of varying the operating conditions. In one embodiment, the winding tap connections 88 electrically couple to an external switch to control the fraction of the total winding being powered by the commutator. In another embodiment, the total winding is connected to a more complex module to control the operating characteristics (variable speed, torque, or air flow, etc.) of permanent magnet DC brushless motor 14.

The electronically commutated motor control assembly is highly efficient and reliable. It permits a user to select ECM operating characteristics by determining the desired operating characteristics and selecting the appropriate control module to interface with the ECM. The assembly will allow an affordable base motor to fulfill a greater variety of applicational requirements thereby reducing the inventory and spare parts needed to be stocked, while maintaining flexible and efficient performance.

While the invention has been described in terms of various specific embodiments, those skilled in the art will recognize that the invention can be practiced with modification within the spirit and scope of the claims.

What is claimed is:

1. A method for selecting operating characteristics of a permanent magnet DC brushless motor using a control module, said method comprising:
   coupling an electronic commutator to the permanent magnet DC brushless motor;
   electrically coupling at least one control module to the commutator;
   selecting operating characteristics for the motor through the control module, the control module for controlling the operating characteristics of the electronically commutated permanent magnet DC brushless motor; and
   mounting the control module on an external surface of a shell of the permanent magnet DC brushless motor.

2. A method in accordance with claim 1 wherein the control module comprises at least one of a power supply regulating circuit, an electromagnetic interference filter, an electronically commutated motor speed modulator, an electronically commutated motor torque modulator, a transient suppression circuit, an active power factor correction circuit, a passive power factor correction circuit, and a process parameter control circuit.

3. A method in accordance with claim 1 wherein the control module is configured to mount remotely from the motor.

4. A control assembly for a permanent magnet DC brushless motor, the motor including a shell, said control assembly comprising:
   an electronic commutator comprising at least one of an H-bridge inverter circuit, a rotor position sensing circuit, a low voltage power supply, and a gate-drive circuit, said electronic commutator configured to be electrically coupled to the motor; and
   a control module coupled to said commutator for controlling operating characteristics of the permanent magnet DC brushless motor, said control module configured to be mounted on an external surface of the shell of the permanent magnet DC brushless motor.

5. A control assembly in accordance with claim 4 wherein said control module comprises a power supply regulating circuit.

6. A control assembly in accordance with claim 5 wherein said power supply regulating circuit comprises a bridge rectifier circuit.

7. A control assembly in accordance with claim 4 wherein said control module comprises an electromagnetic interference filter.

8. A control assembly in accordance with claim 4 wherein said control module comprises an electronically commutated motor speed modulator.

9. A control assembly in accordance with claim 4 wherein said control module comprises an electronically commutated motor torque modulator.

10. A control assembly in accordance with claim 4 wherein said control module comprises a transient suppression circuit.

11. A control assembly in accordance with claim 4 wherein said control module comprises an active power factor correction circuit.

12. A control assembly in accordance with claim 4 wherein said control module comprises a passive power factor correction circuit.

13. A control assembly in accordance with claim 4 wherein said control module comprises a process parameter control circuit.

14. A control assembly in accordance with claim 4 wherein said control module is configured to mount remotely from said permanent magnet DC brushless motor.

15. A control module for an electronically commutated motor, said control module comprising at least one of: a power supply regulating circuit, an electromagnetic interference filter, an electronically commutated motor speed modulator, an electronically commutated motor torque modulator, a transient suppression circuit, an active power factor correction circuit, a passive power factor correction circuit, and a process parameter control circuit, said control module configured to change an operating characteristic of said motor based on a user's specification that determines an implementation of said at least one of said power supply regulating circuit, said electromagnetic interference filter, said electronically commutated motor speed modulator, said electronically commutated motor torque modulator, said transient suppression circuit, said active power factor correction circuit, said passive power factor correction circuit, and said process parameter control circuit within said control module.

16. A control module in accordance with claim 15 wherein said control module couples to an external surface of the motor.

17. An electronically commutated motor assembly comprising:
   a permanent magnet DC brushless motor comprising a plurality of external winding connections coupled to an external surface of said electronically commutated motor, at least one stator winding electrically coupled to said plurality of external winding connections;
   an electronic commutator, said electronic commutator electrically coupled to said motor;
   a position sensing electronic circuit electrically connected to said electronic commutator; and
   a control module configured to control operating characteristics of said permanent magnet DC brushless motor, said control module mounted on an external surface of a shell of said permanent magnet DC brushless motor.

18. An electronically commutated motor assembly in accordance with claim 17 wherein said commutator comprises a simplified H-bridge.

19. An electronically commutated motor assembly in accordance with claim 17 wherein said commutator comprises an over-current protection electronic circuit.

20. An electronically commutated motor assembly comprising a permanent magnet DC brushless motor, said permanent magnet DC brushless motor comprising a plurality of external winding connections coupled to an external surface of the motor, at least one stator winding electrically coupled to said plurality of external winding connections, a commutator electrically coupled to the at least one stator winding, said commutator comprising an H-bridge inverter and at least one of a bridge rectifier, an over-current protection circuit, and a position sensing electronic circuit electrically connected to said commutator, and a control module for controlling operating characteristics of said motor, said control module comprising at least one of a power supply regulating circuit, an electromagnetic interference filter, an electronically commutated motor speed modulator, an electronically commutated motor torque modulator, a transient suppression circuit, an active power factor correction circuit, a passive power factor correction circuit and a process parameter control circuit.

21. An electronically commutated motor assembly in accordance with claim 20 wherein said control module mounts remotely from the electronically commutated motor.

22. An electronically commutated motor assembly in accordance with claim 20 wherein said commutator couples to an external surface of an electronically commutated motor shell.

23. A control assembly in accordance with claim 4 wherein said control module comprises a microprocessor.

* * * * *